US012400205B2

(12) United States Patent
Charles et al.

(10) Patent No.: US 12,400,205 B2
(45) Date of Patent: Aug. 26, 2025

(54) VIRTUAL POINT OF SALE

(71) Applicant: American Express Travel Related Services Company, Inc., New York, NY (US)

(72) Inventors: Kinderley Charles, Miami, FL (US); Manish Kumar Das, Cooper City, FL (US); Venkata Rama Rao Inuganti, Plantation, FL (US); Prasad Prakash Kanvinde, Weston, FL (US); Phillip Salvant, Miami, FL (US); Marami Sen, Plantation, FL (US); Christopher Paul Sheridan, Parkland, FL (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 17/806,214

(22) Filed: Jun. 9, 2022

(65) Prior Publication Data

US 2022/0300938 A1     Sep. 22, 2022

Related U.S. Application Data

(63) Continuation of application No. 15/847,265, filed on Dec. 19, 2017, now Pat. No. 11,436,585.

(51) Int. Cl.
G06Q 20/20        (2012.01)
G06Q 20/12        (2012.01)
(Continued)

(52) U.S. Cl.
CPC ........... *G06Q 20/204* (2013.01); *G06Q 20/12* (2013.01); *G06Q 20/322* (2013.01); *G06Q 20/36* (2013.01); *G07G 1/14* (2013.01); *H04W 4/021* (2013.01)

(58) Field of Classification Search
CPC ...... G06Q 20/204; G06Q 20/36; G06Q 20/12; G06Q 20/322; G06Q 20/3224; G06Q 20/352; G06Q 20/40; G06Q 20/20; G06Q 20/18; G06Q 30/0261; G06Q 30/06; G06Q 30/0639; G06Q 30/0631; G06Q 30/0252; G06Q 30/0255; G06Q 30/0256;
(Continued)

(56) References Cited

U.S. PATENT DOCUMENTS 7,366,703 B2    4/2008  Gray et al.
9,501,773 B2   11/2016  Dai
(Continued)

FOREIGN PATENT DOCUMENTS

WO    WO-2014013071 A1 *  1/2014  ............. G06Q 20/10

OTHER PUBLICATIONS

International Search Report and Written Opinion dated Jan. 10, 2019 in PCT Application No. PCT/US2018/054428.
(Continued)

*Primary Examiner* — Avia Salman
(74) *Attorney, Agent, or Firm* — Sterne, Kessler, Goldstein & Fox P.L.L.C.

(57) ABSTRACT

A merchant registers a geolocation for a virtual point of sale. A consumer points a consumer device at the geolocation, and an icon representing the virtual point of sale is displayed on the consumer device in augmented reality. The consumer selects the icon to initiate a transaction with a digital wallet on the consumer device.

20 Claims, 3 Drawing Sheets

(51) Int. Cl.
*G06Q 20/32* (2012.01)
*G06Q 20/36* (2012.01)
*G07G 1/14* (2006.01)
*H04W 4/021* (2018.01)

(58) Field of Classification Search
CPC ........... G06Q 30/0284; G06Q 30/0641; G06Q 30/0238; G06Q 30/0268; G06Q 20/326; G06Q 30/0267; G06Q 20/027; G06Q 20/351; G06Q 20/405; G06Q 20/409; G06Q 30/0259; G07G 1/14; G07G 1/0009; H04W 4/021; H04W 84/18; H04W 4/029; H04W 12/63; G07B 2017/00225; G07F 7/088; G06F 16/909; G06F 16/9535; G06F 16/954; H04L 67/52; H04L 67/53; H04L 67/104; G01S 2205/008; G01S 5/0063
USPC .......................................................... 705/16
See application file for complete search history.

(56) References Cited

U.S. PATENT DOCUMENTS

| | | |
|---|---|---|
| 2010/0088188 A1 | 4/2010 | Kumar et al. |
| 2011/0028160 A1 | 2/2011 | Roeding et al. |
| 2012/0203632 A1 | 8/2012 | Blum et al. |
| 2012/0299961 A1* | 11/2012 | Ramkumar ........ G06Q 30/0643 345/632 |
| 2013/0203444 A1 | 8/2013 | Perry et al. |
| 2013/0238455 A1 | 9/2013 | Laracey |
| 2014/0019352 A1 | 1/2014 | Shrivastava |
| 2014/0337175 A1 | 11/2014 | Katzin et al. |
| 2015/0012426 A1* | 1/2015 | Purves ................. G02B 27/017 705/41 |
| 2015/0058145 A1* | 2/2015 | Luciani .............. G06Q 20/3274 705/17 |
| 2015/0248664 A1* | 9/2015 | Makhdumi ........ G06Q 20/3274 235/380 |
| 2015/0332265 A1* | 11/2015 | Perry .................... C08G 18/14 705/44 |
| 2016/0253665 A1 | 9/2016 | Van Os et al. |
| 2016/0335637 A1 | 11/2016 | Deshpande et al. |
| 2017/0169670 A1 | 6/2017 | Murphy |
| 2019/0188672 A1 | 6/2019 | Charles et al. |

OTHER PUBLICATIONS

International Preliminary Report on Patentability directed to related International Patent Application No. PCT/US2018/54428, dated Nov. 5, 2019; 10 pages.

* cited by examiner

VIRTUAL POINT OF SALE

CROSS-REFERENCE TO RELATED PATENT APPLICATIONS

This application is a continuation of U.S. application Ser. No. 15/847,265, filed on Dec. 19, 2017, which is incorporated herein by reference in its entirety.

FIELD

The disclosure generally relates to computer systems, and more specifically, to systems and methods for processing transactions when traditional hardware is unavailable.

BACKGROUND

Merchants typically utilize point of sale hardware to complete a transaction when a consumer is present at a merchant location. The consumer may swipe or insert a physical card, or near field communication point of sale may communicate with a mobile device of a consumer. For small merchants and merchants in temporary or remote locations, it may be difficult and costly to set up point of sale hardware. Additionally, requiring a consumer to present a card to the merchant may increase the possibility that a fraudulent actor may obtain transaction account information displayed on the card.

SUMMARY

Systems, methods, and articles of manufacture (collectively, the "system") for decreasing computer downtime are disclosed. The system may perform operations including receiving a geolocation for a virtual point of sale from a merchant device; storing the geolocation in a geolocation merchant repository; transmitting the geolocation to a consumer device, wherein the consumer device displays an icon representing the virtual point of sale in augmented reality; receiving an authorization request from the consumer device; and transmitting an authorization response to the consumer device.

In various embodiments, the system may perform operations including determining that the geolocation is not within a specified distance of any other geolocation store in the geolocation repository. The consumer device may open a digital wallet on the consumer device in response to the icon being selected. The system may transmit a payment notification to the merchant device. The system may transmit a plurality of geolocations for a plurality of virtual points of sale to the consumer device, wherein the consumer device displays the plurality of geolocations in a map. The system may receive a transaction amount from the consumer device, and transfer the transaction amount to a merchant associated with the merchant device. The consumer device may display the icon in response to the consumer device being pointed at the geolocation.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
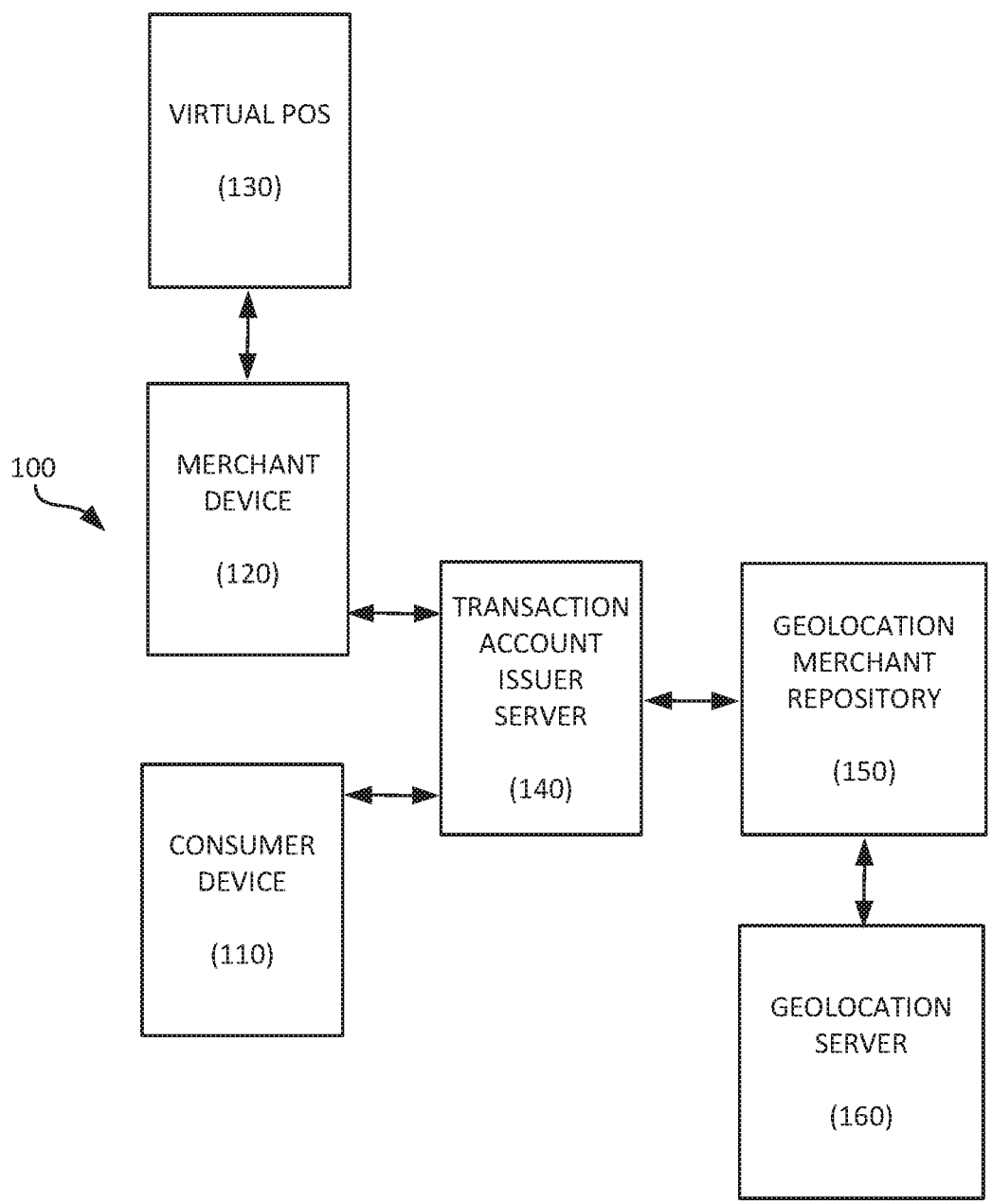
FIG. 1 is a block diagram illustrating various system components of a system for completing transactions with a virtual point of sale, in accordance with various embodiments.

The detailed description of exemplary embodiments herein makes reference to the accompanying drawings, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

In general, and in various embodiments, the systems may provide a virtual point of sale which facilitates transactions when traditional point of sale hardware is unavailable. A merchant may register a geolocation with a geolocation repository. The merchant may instruct a consumer to point a mobile device at the geolocation. The mobile device may use augmented reality to display a virtual point of sale. The consumer may interface with the virtual point of sale to send funds to the merchant using a digital wallet on the mobile device. A transaction account issuer may transmit a notification to the merchant that the funds have been transferred.

Technology costs and resource costs associated with purchasing and maintaining point of sale computer systems may be reduced utilizing the systems and methods described herein. In that regard, the system may result in reductions to monetary costs associated with the unnecessary operation of point of sale system components and hardware.

By creating a virtual point of sale, the systems and methods described herein may allow a consumer to transfer funds with a digital wallet on the consumer's device, without requiring the merchant to supply a traditional point of sale system. The virtual point of sales may be utilized in many situations, such as for small merchants, merchants at festivals or temporary booths, for peer-to-peer payments, garage sales, at multiple locations within a brick and mortar store, such as at each table in a restaurant, etc.

By transmitting, storing, and accessing data using the processes described herein, the security of the transaction is increased and fraud is reduced, which decreases the risk of the computer or network from being compromised. For example, the consumer and merchant may complete a transaction without the consumer exposing an account number, card, or similar information to the merchant.

The system further improves the functioning of the computer and/or networked environment by improving the reliability of the computer system and increasing the amount of time that the computer system is capable of performing operations. The system also eliminates the need for extra hardware that mobile payment platforms such as Apple Pay or Samsung would require since it is a virtual location. It also reduces processing time because the merchant does not have to swipe a card and have it authorized. In contrast, the virtual point of sale application will have already authorized the card member. The system may save on computer storage space because the point of sale system does not have to store any transaction details as it will be handled directly between the card issuer and the consumer.

More particularly, and referring to FIG. 1, a system 100 for completing transactions with a virtual point of sale is disclosed. The system 100 may be computer based, and may comprise a processor, a tangible non-transitory computer-readable memory, and/or a network interface, along with other suitable system software and hardware components. Instructions stored on the tangible non-transitory memory may allow the system 100 to perform various functions, as described herein. The system 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

The system 100 may comprise a consumer device 110, a merchant device 120, a virtual point of sale 130, a transaction account issuer server 140, a geolocation merchant repository 150, and a geolocation server 160. The various systems, coordinators, environments, processors, inventories, databases, containers, and the like in system 100 may be in direct logical communication with each other via a bus, network, and/or through any other suitable means, or may be individually connected as described further herein. For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system. For example, and in accordance with various embodiments, the individual components of system 100 may be interconnected via a network.

In various embodiments, the consumer device 110 may be in electronic and/or logical communication with the merchant device 120, the transaction account issuer server 140, the geolocation merchant repository 150, and/or the geolocation server 160. The consumer device 110, the merchant device 120, the transaction account issuer server 140, the geolocation merchant repository 150, and/or the geolocation server 160 may each comprise a computer-based system, processor, or the like capable of retrieving data, performing operations, monitoring the operation of various system 100 components, and instructing various system 100 components as discussed further herein. In that regard, the each system component may include one or more processors and/or one or more tangible, non-transitory memories and be capable of implementing logic. In various embodiments, each system component may comprise a processor configured to implement various logical operations in response to execution of instructions, for example, instructions stored on a non-transitory, tangible, computer-readable medium.

The consumer device 110 may comprise a smartphone, tablet, computer, or any other suitable device capable of communicating over a network. The consumer device 110 may comprise may comprise a camera and a screen capable of displaying images captured by the camera. The consumer device 110 may comprise geolocation hardware and/or software which allows the consumer device 110 to transmit a current location and/or be tracked by satellites, cellular towers, near field communication transponders, or other location hardware. The consumer device 110 may comprise a hardware and/or software compass which can determine the physical orientation of the consumer device 110. The consumer device 110 may comprise a banking application which allows the consumer device 110 to communicate with the transaction account issuer server 140. The consumer device 110 may comprise a digital wallet, such as Apple-Pay® or SamsungPay® which allows the consumer device 110 to initiate financial transactions using the consumer device 110. The consumer device 110 may be configured to display an icon or symbol representing the virtual point of sale 130 in response to the consumer device 110 being pointed at a geolocation representing the virtual point of sale 130.

The merchant device 120 may comprise a smartphone, tablet, computer, or any other suitable device capable of communicating over a network. The merchant device 120 may comprise geolocation hardware and/or software which allows the merchant device 120 to transmit a current location and/or be tracked by satellites, cellular towers, near field communication transponders, or other location hardware. The merchant device 120 may comprise a banking application which allows the merchant device 120 to communicate with the transaction account issuer server 140.

The transaction account issuer server 140 may comprise one or more servers and/or databases. The transaction account issuer server 140 may provide multiple services, such as transaction authorization services, virtual point of sale services, and any other services typically associated with financial institutions.

The geolocation merchant repository 150 may comprise one or more databases and/or servers. The geolocation merchant repository 150 may store data regarding a plurality of virtual points of sale, including the virtual point of sale 130. The data may include the geolocation of the virtual points of sale, the merchant name, merchant number, a time duration that the virtual point of sale is active, etc. The geolocation merchant repository 150 may communicate with the geolocation server 160 using a geolocation API, such as Google® Maps API. The geolocation server 160 may provide services such as place information, which accesses names, addresses and other rich details for places; location detection, which may return the location of a device without relying on GPS; geocoding, which converts addresses to geographic coordinates or vice versa; distance data, which provides distances between locations; multiple map displays, such as street view, satellite, static maps, interactive maps, among other functions.

Figure 2:
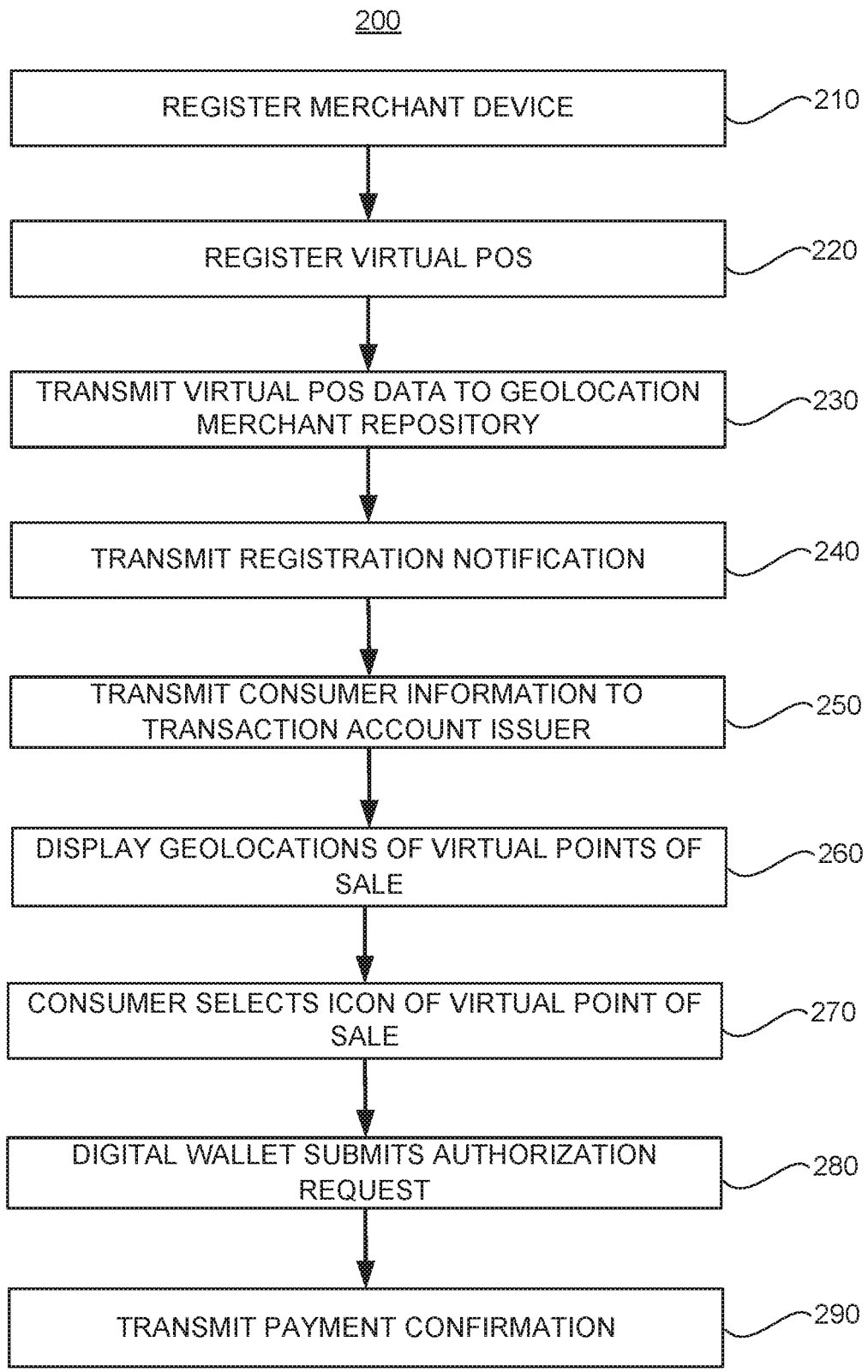
FIG. 2 illustrates process flow for a method of completing transactions with a virtual point of sale, in accordance with various embodiments.

Referring to FIG. 2, a flowchart of a process 200 for completing a transaction utilizing a virtual point of sale is illustrated, according to various embodiments. A merchant may register the merchant device 120 with the transaction account issuer server 140 (step 210). The transaction account issuer server 140 may return a merchant identifier to the merchant device 120 or use an existing merchant identifier. The merchant may register the virtual point of sale 130 using the merchant device 120 (step 220). For example, the merchant may enter geolocation coordinates of the virtual point of sale into the merchant device 120, such as GPS coordinates, a street address, implement a location tracking device (Find my iPhone), etc. The merchant will use the banking application to register the coordinates. The banking application may automatically detect where the merchant is holding the merchant device 120 and ask the merchant if they want to register their current location as a virtual point of sale location. In various embodiments, the merchant device 120 may transmit a current location of the merchant device to the transaction account issuer server 140. The transmission may be the result of the merchant selecting an icon or tapping a button on the merchant device 120. Providing the location of the merchant device may be a simplified way for a merchant to indicate a desired location for the virtual point of sale 130. In other words, the merchant is instructing the system to set the virtual point of sale 130 location at the current location of the merchant device at the time the icon is selected on the merchant device.

In various embodiments, the merchant may identify the physical location of the virtual point of sale using an item that a consumer may view, such as displaying a bullseye or creating a sign with text, such as "Virtual POS—point phone here." The merchant may establish a time limit for the virtual point of sale 130, such as limiting the virtual point of sale 130 to the next twenty-four hours, or the merchant may establish a start time and a stop time, or multiple time periods for the virtual point of sale 130 to be active. When registering the geolocation, the application may ask the merchant if they would like to only have the geolocation available for a time window. In other words, the system will ask if the merchant wants to have the location active starting on a specific date and time and/or ending at a specific date and time. When consumers use a virtual point of sale application on their consumer device, only locations that are available during that specific date and time will appear.

The transaction account issuer server 140 may transmit data regarding the geolocation of the virtual point of sale 130, including an active time window for the point of sale if so specified by the merchant, to the geolocation merchant repository 150 (step 230). The geolocation merchant repository 150 may store the data regarding the virtual point of sale 130. The geolocation merchant repository 150 may transmit an API call to the geolocation server 160 to determine a minimum distance between the virtual point of sale 130 and any other virtual points of sale stored in the geolocation merchant repository 150. In various embodiments, if the virtual point of sale 130 is less than a minimum distance from a stored virtual point of sale, such as less than fifty feet, the geolocation merchant repository may decline registration of the virtual point of sale 130. This may prevent confusion of multiple virtual points of sale existing in the same or nearby locations. If the data regarding the virtual point of sale 130 is acceptable, the geolocation merchant repository 150 may transmit a registration notification to the transaction account issuer server 140, which may in turn transmit a registration notification to the merchant device 120 (step 240).

A consumer may wish to make a purchase from the merchant. The consumer may utilize a virtual point of sale application on the consumer device 110. In various embodiments, the virtual point of sale application may be a portion of the banking application previously discussed, or the virtual point of sale application may be a separate application on the consumer device 110. The virtual point of sale application may cause the consumer device 110 to transmit information about the consumer to the merchant via the transaction account issuer server 140 (step 250). Information may include the consumer name, phone number, email address, and potentially the consumer location. The transaction account issuer server 140 may transmit the location to the geolocation merchant repository 150. The geolocation merchant repository 150 may transmit an API call to the geolocation server 160 to identify virtual points of sale that are nearby the consumer device 110. The geolocation merchant repository 150 may transmit the virtual point of sale geolocations, including the geolocation for the virtual point of sale 130 to the transaction account issuer server 140, which may in turn transmit the geolocations to the consumer device 110.

The consumer device 110 may display the geolocations of the virtual points of sale on a user interface of the consumer device 110 (step 260). In various embodiments, the consumer device 110 may display the geolocations of the virtual points of sale on a map interface. However, in various embodiments, the consumer device 110 may display the virtual point of sale 130 in augmented reality on the user interface of the consumer device 110. Augmented reality may be a live direct or indirect view of a physical, real-world environment whose elements are augmented by a computer-generated or extracted real-world sensory input such as sound, video, graphics, or GPS data. For example, the consumer may point the camera of the consumer device 110 at the geolocation of the virtual point of sale 130, and the user interface may display the image captured by the camera, as well as an icon representing the virtual point of sale 130 superimposed over the image captured by the camera. In various embodiments, the icon may be an image, symbol, word, or any other graphical element representing the virtual point of sale 130.

The consumer may select the icon representing the virtual point of sale 130 (step 270). In response to the consumer selecting the icon, the consumer device 110 may open the digital wallet on the consumer device 110. Upon the consumer clicking on the icon, the consumer device 110 may prompt the user to select which transaction account they wish to use. The consumer device 110 may prepopulate fields in the digital wallet to indicate the merchant as the recipient of a transaction, such as by populating or storing the merchant ID. The consumer device 110 may receive the merchant ID from the geolocation merchant repository 150. The consumer may input an amount of the transaction into the digital wallet. In various embodiments, the consumer may use the consumer device 110 to scan barcodes, QR-codes, or other indicia on items that the consumer would like to purchase, and the digital wallet may populate fields with the items and/or prices for the items. The digital wallet may submit an authorization request for the transaction to the transaction account issuer server 140 (step 280). The transaction account issuer server 140 may transmit an authorization response to the consumer device 110 indicating whether the authorization request has been approved or denied. The consumer device may display the authorization response and the consumer can show the display to the merchant. Additionally, the transaction account issuer server 140 may transmit a payment notification to the geolocation merchant repository 150 indicating that the payment has been made. The geolocation merchant repository 150 may match the virtual point of sale with the merchant device 120. The geolocation merchant repository 150 or the transaction account issuer server 140 may transmit a payment confirmation to the merchant device 120, which may include an amount of the payment and an identity of the consumer transmitting the payment, such as the consumer name (step 290).

Figure 3:
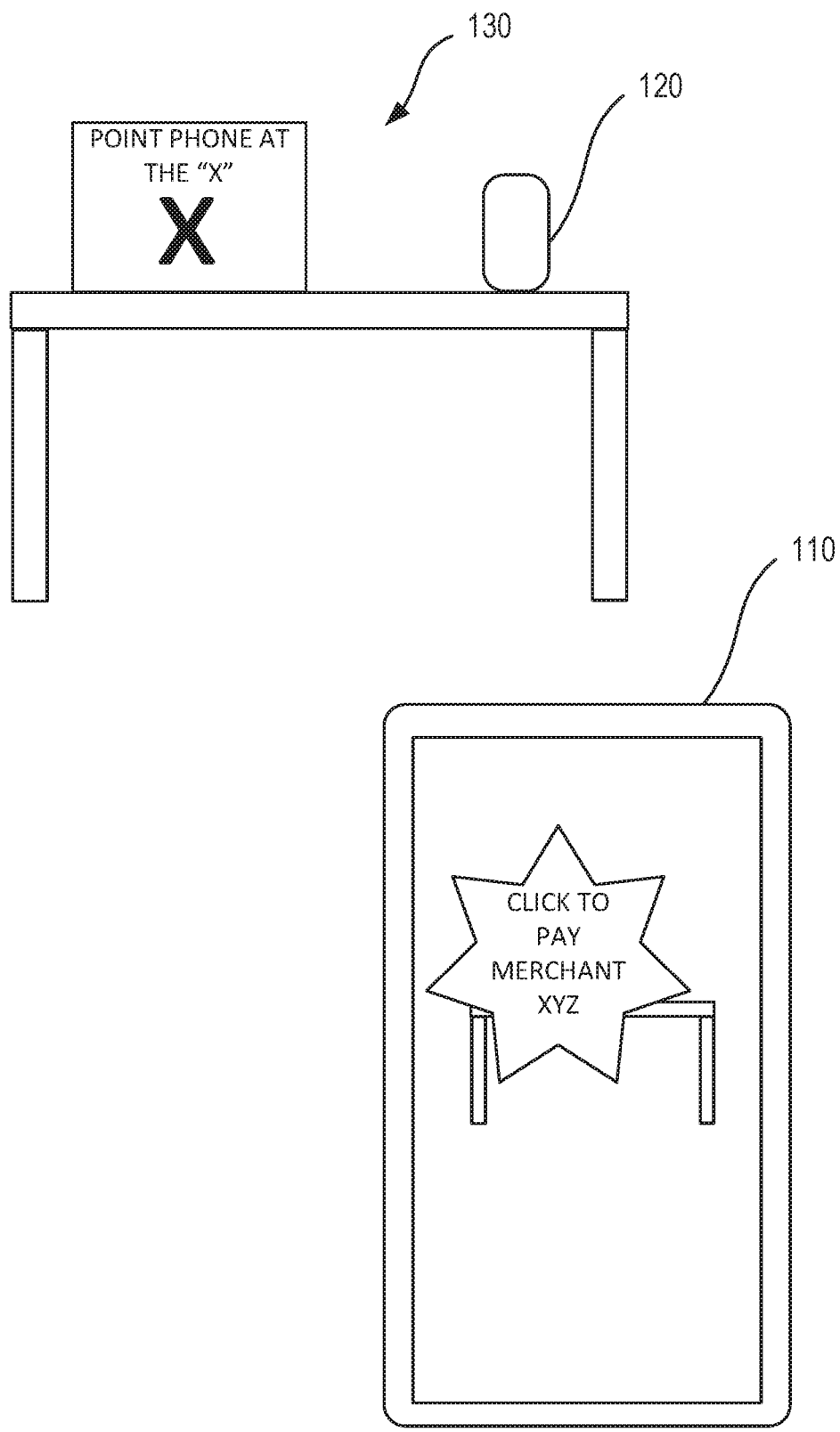
FIG. 3 illustrates an example of a virtual point of sale, in accordance with various embodiments.

Referring to FIG. 3, an example of a virtual point of sale is illustrated, according to various embodiments. The merchant device 120 may create the virtual point of sale 130 by transmitting the geolocation of the virtual point of sale 130 to a transaction account issuer or other entity. When a consumer would like to make a purchase, the merchant may instruct the consumer to point the consumer device 110 to the geolocation of the virtual point of sale 130. The virtual point of sale 130 may appear as an icon on the user interface of the consumer device 110 in augmented reality. In response to the consumer clicking or otherwise selecting the icon, the consumer device 110 may open the digital wallet on the consumer device 110, and the consumer may proceed to transmit funds to the merchant using the digital wallet.

The disclosure and claims do not describe only a particular outcome of completing a transaction, but the disclosure and claims include specific rules for implementing the outcome of completing a transaction and that render information into a specific format that is then used and applied to create the desired results of completing a transaction, as set forth in McRO, Inc. v. Bandai Namco Games America Inc. (Fed. Cir. case number 15-1080, Sep. 13, 2016). In other words, the outcome of completing a transaction can be performed by many different types of rules and combinations of rules, and this disclosure includes various embodiments with specific rules. While the absence of complete preemption may not guarantee that a claim is eligible, the disclosure does not sufficiently preempt the field of completing a transaction at all. The disclosure acts to narrow, confine, and otherwise tie down the disclosure so as not to cover the general abstract idea of just completing a transaction. Significantly, other systems and methods exist for completing a transaction, so it would be inappropriate to assert that the claimed invention preempts the field or monopolizes the basic tools of completing a transaction. In other words, the disclosure will not prevent others from completing a transaction, because other systems are already performing the functionality in different ways than the claimed invention. Moreover, the claimed invention includes an inventive concept that may be found in the non-conventional and non-generic arrangement of known, conventional pieces, in conformance with Bascom v. AT&T Mobility, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to automatically launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is re-directed to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, the term "network" may include any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE®talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, Digital Subscriber Line (DSL), or various wireless communication methods. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at predetermined intervals, periodic, randomly, once, more than once, or in response to a suitable request or action. Any of the information may be distributed and/or accessed via a software enabled link, wherein the link may be sent via an email, text, post, social network input and/or any other method known in the art.

The system or any components may integrate with system integration technology such as, for example, the ALEXA system developed by AMAZON. Alexa is a cloud-based voice service that can help you with tasks, entertainment, general information and more. All Amazon Alexa devices, such as the Amazon Echo, Amazon Dot, Amazon Tap and Amazon Fire TV, have access to the Alexa Voice Service. The system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The system may allow the user to access information about eligible accounts linked to an online account across all Alexa-enabled devices.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER, JAVA Virtual Machine running on LINUX or WINDOWS).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, NY), various database products available from ORACLE® Corporation (Redwood Shores, CA), MICROSOFT® Access® or MICROSOFT® SQL Server® by MICROSOFT® Corporation (Redmond, Washington), MySQL by MySQL AB (Uppsala, Sweden), MongoDB®, Redis®, Apache Cassandra®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQ™ (formerly MQSeries) by IBM®, Inc. (Armonk, NY) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

The process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIGS. 2-5, but also to the various system components as described above with reference to FIG. 1.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
  accessing, on a mobile device, a virtual point of sale application;
  transmitting, to a transaction server via the virtual point of sale application, location data corresponding to a location of the mobile device;
  receiving, from the transaction server via the virtual point of sale application, a first geolocation corresponding to a first virtual point of sale and a second geolocation corresponding to a second virtual point of sale,
  wherein the first and second virtual points of sale are based on the location data from the mobile device and a time window indicating when the first and second virtual points of sale corresponding to the first and second geolocations are accessible,
  wherein the first virtual point of sale and the second virtual point of sale were previously registered with the transaction server based on a determination that a distance between the first geolocation of the first virtual point of sale and the second geolocation of the second virtual point of sale was greater than a minimum distance;
  capturing, via a camera of the mobile device, an image of a visual sign located at a physical location identified by the first geolocation received from the transaction server, wherein the visual sign is linked to a merchant identifier;

determining, via a physical orientation of the mobile device, that the first geolocation is captured in the image;

displaying, by the virtual point of sale application, the image with an icon overlaying the visual sign in the image, wherein the icon corresponds to the first virtual point of sale;

detecting an interaction with the icon overlaying the visual sign in the image; and in response to detecting the interaction,
accessing a digital wallet, via the virtual point of sale application;
determining the merchant identifier based on the first geolocation; and
populating a digital wallet transaction field with the merchant identifier to execute a transaction with the first virtual point of sale.

2. The method of claim 1, further comprising:
displaying, by the virtual point of sale application, a map interface with the first geolocation and the second geolocation.

3. The method of claim 1, wherein accessing the virtual point of sale application further comprises:
accessing, on the mobile device, a banking application, wherein the virtual point of sale application is part of the banking application.

4. The method of claim 1, wherein capturing the image further comprises:
capturing a live video of the first geolocation.

5. The method of claim 1, further comprising:
displaying a prompt instructing a user to select a transaction account to execute the transaction with the first virtual point of sale.

6. The method of claim 1, wherein determining the merchant identifier further comprises:
receiving, by the virtual point of sale application, the merchant identifier from the transaction server based on the first geolocation.

7. The method of claim 1, further comprising:
generating, by the virtual point of sale application, a digital wallet interface allowing a user to enter a transaction amount to execute the transaction with the first virtual point of sale using the digital wallet.

8. A mobile device, comprising:
a camera;
a display screen;
a memory; and
at least one processor coupled to the memory and configured to:
access a virtual point of sale application using instructions stored on the memory;
transmit, to a transaction server via the virtual point of sale application, location data corresponding to a location of the mobile device;
receive, from the transaction server via the virtual point of sale application, a first geolocation corresponding to a first virtual point of sale based on the location data, and a second geolocation corresponding to a second virtual point of sale,
wherein the first and second virtual points of sale are based on the location data from the mobile device and a time window indicating when the first and second virtual points of sale corresponding to the first and second geolocations are accessible, and
wherein the first virtual point of sale and the second virtual point of sale were previously registered with the transaction server based on a determination that a distance between the first geolocation of the first virtual point of sale and the second geolocation of the second virtual point of sale was greater than a minimum distance;

capture, via the camera, an image of a visual sign located at a physical location identified by the first geolocation received from the transaction server, wherein the visual sign is linked to a merchant identifier;

determine, via a physical orientation of the mobile device, that the first geolocation is captured in the image;

display, by the virtual point of sale application on the display screen, the image with an icon overlaying the visual sign in the image, wherein the icon corresponds to the first virtual point of sale;

detect an interaction with the icon overlaying the visual sign in the image; and in response to detecting the interaction,
access a digital wallet, via the virtual point of sale application;
determine the merchant identifier based on the first geolocation; and
populate a digital wallet transaction field with the merchant identifier to execute a transaction with the first virtual point of sale.

9. The mobile device of claim 8, wherein the at least one processor is further configured to:
display, by the virtual point of sale application, a map interface with the first geolocation and the second geolocation.

10. The mobile device of claim 8, wherein to access the virtual point of sale application, the at least one processor is further configured to:
access a banking application, wherein the virtual point of sale application is part of the banking application.

11. The mobile device of claim 8, wherein to capture the image, the at least one processor is further configured to:
capture, via the camera, a live video of the first geolocation.

12. The mobile device of claim 8, wherein the at least one processor is further configured to:
display a prompt instructing a user to select a transaction account to execute the transaction with the first virtual point of sale.

13. The mobile device of claim 8, wherein to determine the merchant identifier, the at least one processor is further configured to:
receive, by the virtual point of sale application, the merchant identifier from the transaction server based on the first geolocation.

14. The mobile device of claim 8, wherein the at least one processor is further configured to:
generate, by the virtual point of sale application, a digital wallet interface allowing a user to enter a transaction amount to execute the transaction with the first virtual point of sale using the digital wallet.

15. A non-transitory computer-readable device having instructions stored thereon that, when executed by at least one computing device, cause the at least one computing device to perform operations comprising:
accessing, by the at least one computing device, a virtual point of sale application;
transmitting, to a transaction server via the virtual point of sale application, location data corresponding to a location of the at least one computing device;

receiving, from the transaction server via the virtual point of sale application, a first geolocation corresponding to a first virtual point of sale and a second geolocation corresponding to a second virtual point of sale,
wherein the first and second virtual points of sale are based on:
the location data from the at least one computing device, and
a time window indicating when the first and second virtual points of sale corresponding to the first and second geolocations are accessible, and
wherein the first virtual point of sale and the second virtual point of sale were previously registered with the transaction server based on a determination that a distance between the first geolocation of the first virtual point of sale and the second geolocation of the second virtual point of sale was greater than a minimum distance;
capturing, via a camera of the at least one computing device, an image of a visual sign located at a physical location identified by the first geolocation received from the transaction server, wherein the visual sign is linked to a merchant identifier;
determining, via a physical orientation of the at least one computing device, that the first geolocation is captured in the image;
displaying, by the virtual point of sale application, the image with an icon overlaying the visual sign in the image, wherein the icon corresponds to the first virtual point of sale;
detecting an interaction with the icon overlaying the visual sign in the image; and
in response to detecting the interaction,
accessing a digital wallet, via the virtual point of sale application;
determining the merchant identifier based on the first geolocation; and
populating a digital wallet transaction field with the merchant identifier to execute a transaction with the first virtual point of sale.

16. The non-transitory computer-readable device of claim 15, the operations further comprising:
displaying, by the virtual point of sale application, a map interface with the first and second geolocations.

17. The non-transitory computer-readable device of claim 15, wherein accessing the virtual point of sale application further comprises:
accessing, on the at least one computing device, a banking application, wherein the virtual point of sale application is part of the banking application.

18. The non-transitory computer-readable device of claim 15, wherein capturing the image further comprises:
capturing a live video of the first geolocation.

19. The non-transitory computer-readable device of claim 15, wherein determining the merchant identifier further comprises:
receiving, by the virtual point of sale application, the merchant identifier from the transaction server based on the first geolocation.

20. The non-transitory computer-readable device of claim 15, the operations further comprising:
generating, by the virtual point of sale application, a digital wallet interface allowing a user to enter a transaction amount to execute the transaction with the first virtual point of sale using the digital wallet.

* * * * *